(12) United States Patent
Schindler et al.

(10) Patent No.: US 9,929,574 B2
(45) Date of Patent: Mar. 27, 2018

(54) METHOD FOR OPERATING AN ONBOARD NETWORK

(71) Applicant: Bayerische Motoren Werke Aktiengesellschaft, Munich (DE)

(72) Inventors: Moritz Schindler, Munich (DE); Stefan Schaeck, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 250 days.

(21) Appl. No.: 14/665,925

(22) Filed: Mar. 23, 2015

(65) Prior Publication Data

US 2015/0194828 A1 Jul. 9, 2015

Related U.S. Application Data

(63) Continuation of application No. PCT/EP2013/069771, filed on Sep. 24, 2013.

(30) Foreign Application Priority Data

Sep. 24, 2012 (DE) ........................ 10 2012 217 193

(51) Int. Cl.
*H01M 10/44* (2006.01)
*H01M 10/46* (2006.01)
(Continued)

(52) U.S. Cl.
CPC .......... *H02J 7/0021* (2013.01); *B60R 16/033* (2013.01); *H02J 7/0054* (2013.01); *H02J 7/0057* (2013.01); *H02J 7/0075* (2013.01)

(58) Field of Classification Search
CPC ....... H02J 7/0021; H02J 7/0026; H02J 7/0013
(Continued)

(56) References Cited

U.S. PATENT DOCUMENTS

2002/0145404 A1* 10/2002 Dasgupta .............. H02J 7/0013
320/116
2005/0099155 A1* 5/2005 Okuda ................ F02N 11/0866
320/107
(Continued)

FOREIGN PATENT DOCUMENTS

CN 1652426 A 8/2005
CN 1304217 C 3/2007
(Continued)

OTHER PUBLICATIONS

Chinese Office Action issued in Chinese counterpart application No. 201380054866.4 dated Mar. 14, 2016, with English translation (Fifteen (15) pages).
(Continued)

*Primary Examiner* — Edward Tso
(74) *Attorney, Agent, or Firm* — Crowell & Moring LLP

(57) ABSTRACT

An electrical distribution system includes a first energy store and a second energy store. The two energy stores are connected in parallel. Characteristic values of the first and/or second energy store are detected and a regeneration phase of the first energy store is implemented depending on the detected characteristic values. In the regeneration phase, a first operating voltage is preset and provided by means of a generator in such a way that said first operating voltage contributes to the second energy store having, after a preset time span, a higher open-circuit voltage than the first energy store.

16 Claims, 3 Drawing Sheets

(51) Int. Cl.
*H02J 7/00* (2006.01)
*B60R 16/033* (2006.01)

(58) Field of Classification Search
USPC .................................. 320/103, 107, 132, 149
See application file for complete search history.

(56) References Cited

U.S. PATENT DOCUMENTS

| | | | |
|---|---|---|---|
| 2005/0212438 A1* | 9/2005 | Senda | H02J 7/1423 |
| | | | 315/77 |
| 2008/0067972 A1* | 3/2008 | Takami | H01M 4/485 |
| | | | 320/103 |
| 2008/0113226 A1 | 5/2008 | Dasgupta et al. | |
| 2009/0317696 A1 | 12/2009 | Chang | |
| 2012/0242290 A1* | 9/2012 | Asakura | G01R 31/3658 |
| | | | 320/118 |
| 2013/0169038 A1* | 7/2013 | King | B60L 3/0046 |
| | | | 307/10.1 |
| 2013/0252035 A1 | 9/2013 | Lamp et al. | |
| 2014/0055094 A1* | 2/2014 | Takagi | H02J 7/0054 |
| | | | 320/118 |

FOREIGN PATENT DOCUMENTS

| | | |
|---|---|---|
| DE | 10 2009 053 690 A1 | 5/2011 |
| DE | 10 2010 062 116 A1 | 5/2012 |
| JP | 2004-25979 A | 1/2004 |
| WO | WO 02/081255 A1 | 10/2002 |
| WO | WO 2006/122395 A1 | 11/2006 |

OTHER PUBLICATIONS

PCT/EP2013/069771, International Search Report dated Apr. 2, 2014 (Two (2) pages).
German Search Report dated May 31, 2013 with Statement of Relevancy (Six (6) pages).

\* cited by examiner

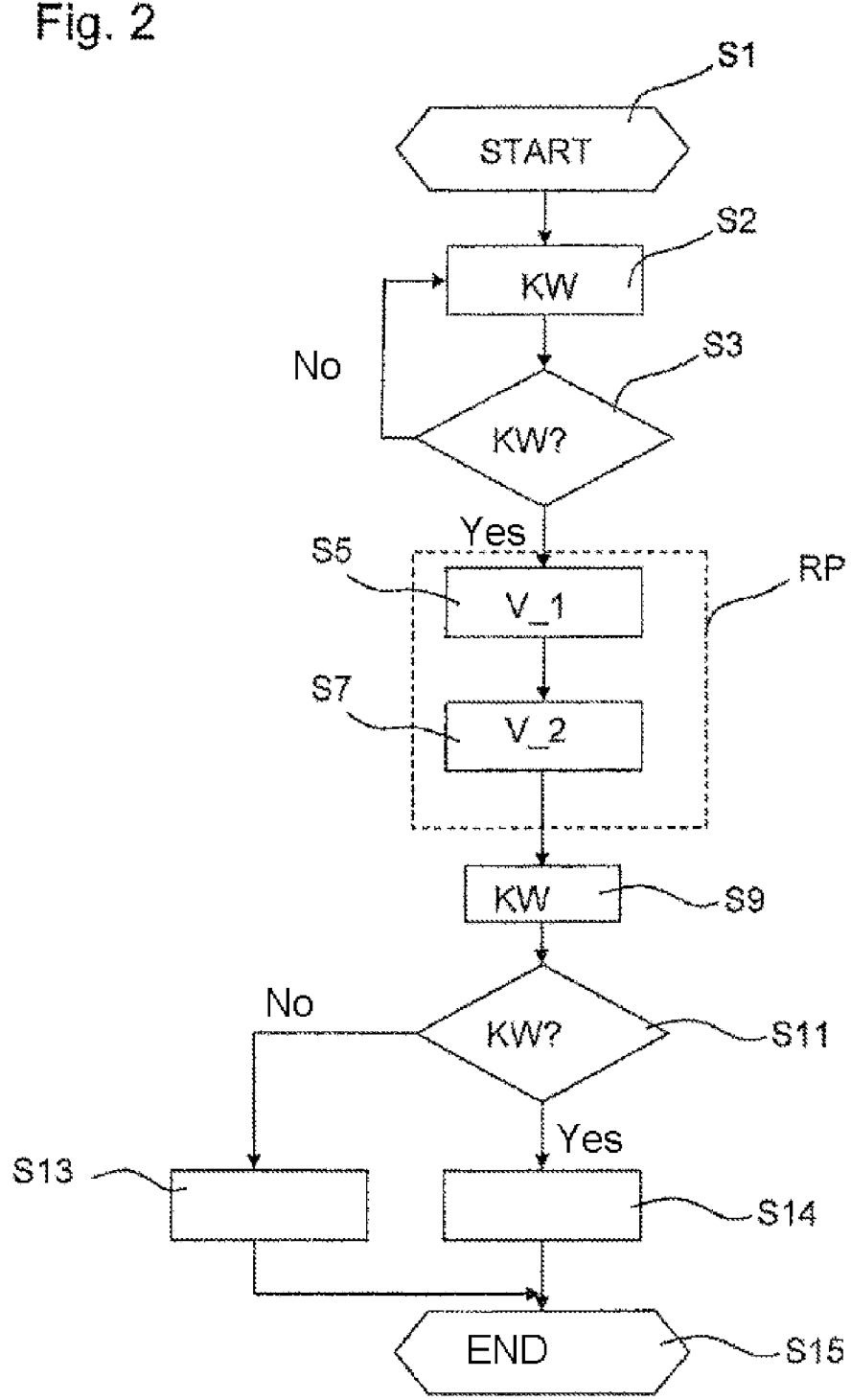

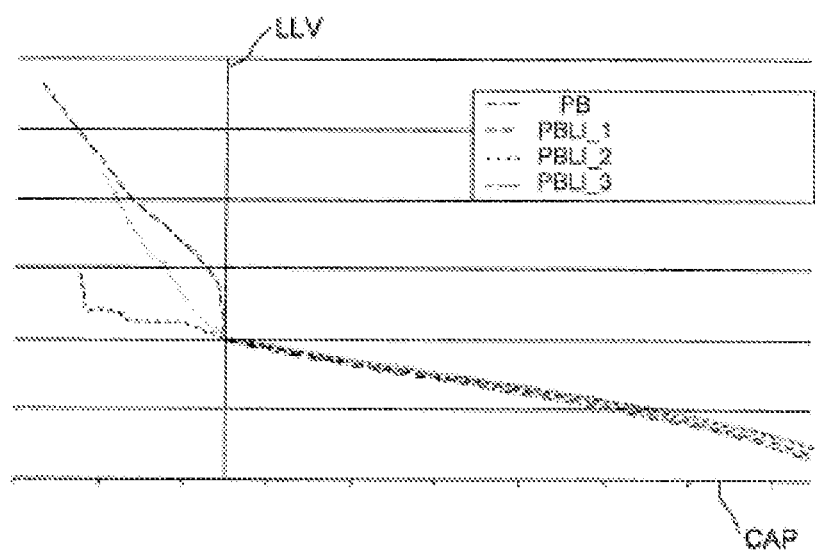

METHOD FOR OPERATING AN ONBOARD NETWORK

CROSS REFERENCE TO RELATED APPLICATIONS

This application is a continuation of PCT International Application No. PCT/EP2013/069771, filed Sep. 24, 2013, which claims priority under 35 U.S.C. § 119 from German Patent Application No. 10 2012 217 193.2, filed Sep. 24, 2012, the entire disclosures of which are herein expressly incorporated by reference.

BACKGROUND AND SUMMARY OF THE INVENTION

The invention relates to a method for operating an electrical distribution system which has a first energy store and a second energy store.

Electrical distribution systems for vehicles usually have an energy store in the form of a lead-acid rechargeable battery. The lead-acid rechargeable battery often requires regeneration, however. This regeneration can last up to 24 hours. Since a normal running operation of a vehicle does not last so long, the regeneration is usually distributed over several running cycles.

The object on which the invention is based consists in providing a method and an apparatus which contribute to an energy store of an electrical distribution system being regenerated.

The object is achieved by the features of the independent patent claims. Advantageous configurations are characterized in the dependent claims.

The invention is characterized by a method or an apparatus for operating an electrical distribution system. The electrical distribution system has a first energy store and a second energy store. The two energy stores are connected in parallel. Characteristic values of the first and/or the second energy store are detected. A regeneration phase of the first energy store is implemented depending on the detected characteristic values. In the regeneration phase, a first operating voltage is preset and provided by means of a generator in such a way that said first operating voltage contributes to the second energy store having, after a preset time span, a higher open-circuit voltage than the first energy store.

Owing to the fact that the two energy stores are connected in parallel, it is possible for the first energy store to be recharged as soon as the second energy store has a higher open-circuit voltage, even if the generator is no longer in operation. It is therefore possible for the first energy store to be further regenerated although a running cycle of the vehicle is completed. By virtue of the regeneration phase being implemented depending on the characteristic values, it is also possible for the regeneration to only be implemented when it is expedient, for example in the case of a specific preset battery temperature of the first energy store.

In accordance with an advantageous configuration, once a preset state of charge of the second energy store has been reached, a second preset operating voltage is provided by means of the generator, which second preset operating voltage contributes to the first energy store being charged and the second energy store approximately maintaining its state of charge. As a result, for example, the second energy store can be charged more quickly using a higher first preset operating voltage and, for example, in the case of a state of charge of 90% capacity, with setting of the second preset operating voltage, can contribute to the first energy store being charged further.

In accordance with a further advantageous configuration, during the regeneration phase, characteristic values of the first energy store are monitored. Thus, the regeneration can be checked and possibly ended, for example, if characteristic values fall below or exceed preset threshold values.

In accordance with a further advantageous configuration, the electrical distribution system has a switch, by means of which the first energy store can be galvanically isolated from the second energy store. As a result, the safety of the electrical distribution system can be increased since it is possible to galvanically isolate the two energy stores from one another, for example if one of the two energy stores is defective.

In accordance with a further advantageous configuration, the first energy store has a lead-acid rechargeable battery. Precisely in vehicle electrical distribution systems, this is a robust and inexpensive energy store.

In accordance with a further advantageous configuration, the second energy store has a lithium-ion rechargeable battery. This is characterized by the fact that it can be charged quickly and has a higher open-circuit voltage than a lead-acid rechargeable battery in the case of a suitable composition.

In accordance with a further advantageous configuration, if there is no or still only a preset low charge flow between the first energy store and the second energy store, a check is performed, depending on the detected characteristic values, to ascertain whether the regeneration phase was successful. As a result, for example, if the regeneration phase has not yet been successful, it is possible to store the fact that a further regeneration phase is required, for example in the next running operation. As an alternative or in addition, if the regeneration phase was successful, it is possible to store that the regeneration has been implemented successfully.

Exemplary embodiments of the invention are explained in more detail below with reference to schematic drawings, in which:

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 shows a flow chart of a program for implementing a regeneration phase, and FIG. 3 shows various voltage profiles of energy stores.

Elements with the same design and function are identified by the same reference symbols throughout the figures.

DETAILED DESCRIPTION OF THE DRAWINGS

Figure 1:
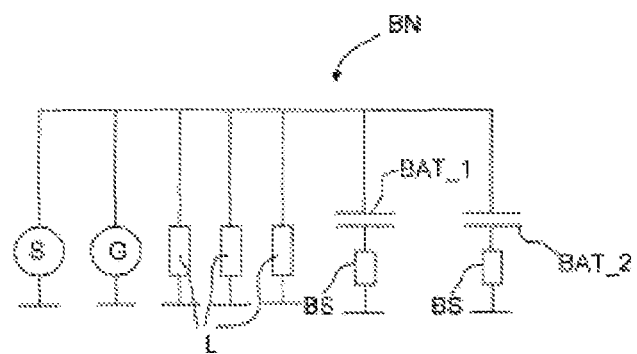
FIG. 1 shows a circuit diagram of an electrical distribution system comprising two energy stores.

FIG. 1 shows a circuit diagram of an electrical distribution system BN. The electrical distribution system BN has a starter S and a generator G.

The electrical distribution system BN also has a plurality of loads L. In addition, the electrical distribution system BN has a first energy store BAT_1 comprising a battery sensor BS and a second energy store BAT_2 comprising a battery sensor BS.

Operating voltages can be provided by means of the generator G, wherein it is possible for a voltage converter to be connected downstream of the generator G in order to set a preset operating voltage.

The first energy store BAT_1 is a lead-acid rechargeable battery, for example. The second energy store BAT_2 is a lithium-ion rechargeable battery, for example, such as a lithium-iron phosphate rechargeable battery (LiFePO4) and/or a lithium nickel manganese cobalt rechargeable battery (Li—NMC) and/or another lithium-ion rechargeable battery and/or a nickel-metal hydride rechargeable battery.

The battery sensors BS are designed to detect characteristic values KW of the respective energy store, such as the respective temperature, an applied voltage, a state of charge, a charge throughput and/or an energy throughput, for example. The determination of the characteristic values can be performed in time-dependent fashion.

For example, in addition a switch can be fitted between the first energy store BAT_1 and the second energy store BAT_2, by means of which switch the two energy stores can be galvanically isolated. Hereby, in each case the energy stores can be isolated from one another if one of the energy stores is defective, for example.

The electrical distribution system BN is arranged in a vehicle, for example. The vehicle in which the electrical distribution system BN is arranged has, for example, an apparatus which has an arithmetic logic unit, a program and data memory and a communications interface. The arithmetic logic unit and/or the data memory can be formed in one unit or distributed among a plurality of units.

In order to operate the electrical distribution system BN, preferably a program is stored in the program and data memory of the apparatus, which program can be executed during operation of the electrical distribution system BN. The program is explained in more detail below with reference to the flow chart in FIG. 2.

The program is started in a step S1, in which variables can be initialized, if appropriate.

In a subsequent step S2, characteristic values KW of the first energy store BAT_1 and/or characteristic values KW of the second energy store BAT_2 are detected. The characteristic values KW are detected by the respective battery sensor BS, for example.

In a subsequent step S3, the detected characteristic values KW are checked, for example by virtue of them being compared with preset threshold values. Thus, for example, the temperature of the respective energy store can be checked since regeneration is advantageous in specific temperature ranges since the charge withdrawal of the first energy store BAT_1 is possibly improved in a specific temperature range and, as a result, the required time period is shortened, if appropriate. In particular when BAT_1 is in the form of a lead-acid rechargeable battery, regeneration is advantageous at an elevated temperature of the lead-acid rechargeable battery.

As an alternative or in addition, a number of cycles of the first energy store BAT_1 can be compared with a threshold value, so that the regeneration is implemented in each case after a preset cycle number. As an alternative or in addition, still further characteristic values KW, such as dwell time and/or charge volume, can be checked.

If it is determined, depending on the detected characteristic values KW, that regeneration is expedient, the program is continued in a step S5. If it is determined that regeneration is not expedient, the program is continued in step S2.

In step S5, the regeneration phase RP is started. For this, a first operating voltage V_1 is preset and provided by means of the generator G in such a way that said first operating voltage contributes to the second energy store BAT_2 having, after a preset time span, a higher open-circuit voltage than the first energy store BAT_1.

If the second energy store BAT_2 has a higher open-circuit voltage than the first energy store BAT_1, it is possible for the regeneration to be implemented further if the generator G is turned off. In such a case, the first energy store BAT_1 is charged further by the second energy store BAT_2 until an equilibrium voltage is set between the two energy stores.

In an optional step S7 following on from step S5, once a preset state of charge of the second energy store BAT_2 has been reached, a second preset operating voltage V_2 is provided by means of the generator G, which second preset operating voltage contributes to the first energy store BAT_1 being charged and the second energy store BAT_2 approximately maintaining its state of charge. As a result, it is possible to charge the second energy store BAT_2 and/or the first energy store BAT_1 more quickly, if appropriate.

If the equilibrium voltage is set, i.e. if there is no or now only a preset low charge flow between the first energy store BAT_1 and the second energy store BAT_2, characteristic values KW continue to be detected in a step S9, such as a voltage present at the first energy store BAT_1, for example.

In a subsequent step S11, a check is performed to ascertain, depending on the detected characteristic values KW, whether the regeneration phase RP was successful. This is checked, for example, by means of the detected voltage. If the detected voltage is above a preset threshold value, for example, or if another characteristic value KW indicates that the regeneration phase RP was successful, the program is continued in a step S14. If the detected voltage is below a preset threshold value or if another characteristic value KW indicates that the regeneration phase RP was not successful, the regeneration phase is continued in a step S13. The characteristic values KW have, as an alternative or in addition, for example, the duration of the regeneration phase RP. Thus, when a preset duration of the regeneration phase RP is reached, for example, the regeneration phase RP can be identified as being successful, wherein the duration of the regeneration phase can vary depending on the type of energy store, for example.

In step S13, since the regeneration phase RP was not successful, the fact is stored, for example, that a further regeneration phase RP is necessary, which can be implemented in the next running operation, for example.

In step S14, since the regeneration phase RP is successful, it is stored, for example, that the regeneration was successful and/or a cycle counter or trigger counter is reset, for example.

In a step S15 following on from step S13 or S14, the program is ended and, if appropriate, can be started again in step S1.

FIG. 3 shows various possible combinations of energy stores in an electrical distribution system. The capacity CAP of a respective energy store combination for an open-circuit voltage LLV is recorded. Voltage profiles of a single lead-acid rechargeable battery PB and of three different combinations of lead-acid rechargeable battery and lithium-ion rechargeable battery PBLI_1, PBLI_2, PBLI_3 are shown.

The point of intersection of the two axes in FIG. 3 is standardized to the completely charged lead-acid rechargeable battery with respect to the x axis for the combinations shown. This state is the ideal state for the lead-acid rechargeable battery. States of charge of the combination of the two rechargeable batteries which are above the maximum charge of the lead-acid rechargeable battery and which result from electrochemical energy stored in the lithium-ion rechargeable battery, are plotted in the direction of the negative x axis. It is apparent from the illustration that, by virtue of the combination of the two rechargeable batteries, even without a present generator operation, a state of the combination of the two rechargeable batteries can be set, which state is above the fully charged state of the lead-acid battery in respect of the open-circuit voltage (y axis). This effect can be used for fully charging the lead-acid rechargeable battery as part of the regeneration thereof.

LIST OF REFERENCE SYMBOLS

BN Electrical distribution system
S Starter
G Generator
L Load
BAT_1 First energy store
BAT_2 Second energy store
BS Battery sensor
KW Characteristic values
RP Regeneration phase
V_1 First operating voltage
V_2 Second operating voltage
LLV Open-circuit voltage
CAP Capacity
PB Voltage profile of lead-acid rechargeable battery
PBLI_1 Voltage profile of first energy store combination
PBLI_2 Voltage profile of second energy store combination
PBLI_3 Voltage profile of third energy store combination The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating an electrical distribution system having a first energy store and a second energy store, wherein the first and second energy stores are connected in parallel, wherein the method comprises the acts of:
   detecting characteristic values of at least one of the first energy store and the second energy store; and
   implementing a regeneration phase of the first energy store depending on said detected characteristic values, wherein in the regeneration phase a first operating voltage is preset and provided by a generator such that said first operating voltage contributes to the second energy store having, after a preset time span, a higher open-circuit voltage than the first energy store,
   wherein once a preset state of charge of the second energy store has been reached, a second preset operating voltage is provided by the generator, where such second preset operating voltage contributes to the first energy store being charged and the second energy store approximately maintaining its state of charge.

2. The method as claimed in claim 1, in which during the regeneration phase, characteristic values of the first energy store are monitored.

3. The method as claimed in claim 2, wherein the electrical distribution system further comprises a switch by which the first energy store can be galvanically isolated from the second energy store.

4. The method as claimed in claim 1, wherein the electrical distribution system further comprises a switch by which the first energy store can be galvanically isolated from the second energy store.

5. The method as claimed in claim 1, wherein the first energy store has a lead-acid rechargeable battery.

6. The method as claimed in claim 1, wherein the second energy store has a lithium-ion rechargeable battery.

7. The method as claimed in claim 1, in which if there is no or still only a preset low charge flow between the first energy store and the second energy store, a check is performed, depending on the detected characteristic values, to ascertain whether the regeneration phase was successful.

8. A method for operating an electrical distribution system having a first energy store and a second energy store, wherein the first and second energy stores are connected in parallel, wherein the method comprises the acts of:
   detecting characteristic values of at least one of the first energy store and the second energy store; and
   implementing a regeneration phase of the first energy store depending on said detected characteristic values, wherein in the regeneration phase a first operating voltage is preset and provided by a generator such that said first operating voltage contributes to the second energy store having, after a preset time span, a higher open-circuit voltage than the first energy store,
   wherein if there is no or still only a preset low charge flow between the first energy store and the second energy store, a check is performed, depending on the detected characteristic values, to ascertain whether the regeneration phase was successful.

9. The method as claimed in claim 8, in which during the regeneration phase, characteristic values of the first energy store are monitored.

10. The method as claimed in claim 8, wherein the electrical distribution system further comprises a switch by which the first energy store can be galvanically isolated from the second energy store.

11. The method as claimed in claim 8, wherein the first energy store has a lead-acid rechargeable battery.

12. The method as claimed in claim 8, wherein the second energy store has a lithium-ion rechargeable battery.

13. An apparatus for operating an electrical distribution system comprising:
   a first energy store connected in parallel with a second energy store;
   a program and data memory configured to store a program; and
   an arithmetic logic unit connected to the program and data memory, wherein the arithmetic logic unit is configured to execute the program to:
      detect characteristic values of at least one of the first energy store and the second energy store, and
      implement a regeneration phase of the first energy store depending on said detected characteristic values, wherein in the regeneration phase a first operating voltage is preset and provided by a generator such that said first operating voltage contributes to the second energy store having, after a preset time span, a higher open-circuit voltage than the first energy store,
   wherein once a preset state of charge of the second energy store has been reached, a second preset operating voltage is provided by the generator, where such second preset operating voltage contributes to the first energy store being charged and the second energy store approximately maintaining its state of charge.

14. The apparatus as claimed in claim 13, in which during the regeneration phase, the arithmetic logic unit is further configured to execute the program to monitor characteristic values of the first energy store.

15. The apparatus as claimed in claim 13, wherein the electrical distribution system further comprises a switch by which the first energy store can be galvanically isolated from the second energy store.

16. The apparatus as claimed in claim 13, in which if there is no or still only a preset low charge flow between the first energy store and the second energy store, the arithmetic logic unit is further configured to execute the program to perform a check, depending on the detected characteristic values, to ascertain whether the regeneration phase was successful.

* * * * *